United States Patent
Issler

(10) Patent No.: US 6,837,146 B2
(45) Date of Patent: Jan. 4, 2005

(54) PISTON FOR INTERNAL COMBUSTION ENGINES

(75) Inventor: Wolfgang Issler, Schwaikheim (DE)

(73) Assignee: Mahle GmbH, Stuttgart (DE)

( * ) Notice: Subject to any disclaimer, the term of this patent is extended or adjusted under 35 U.S.C. 154(b) by 0 days.

(21) Appl. No.: 10/239,473

(22) PCT Filed: Feb. 7, 2001

(86) PCT No.: PCT/DE01/00483
§ 371 (c)(1),
(2), (4) Date: Sep. 23, 2002

(87) PCT Pub. No.: WO01/73322
PCT Pub. Date: Oct. 4, 2001

(65) Prior Publication Data
US 2003/0037670 A1 Feb. 27, 2003

(30) Foreign Application Priority Data
Mar. 24, 2000 (DE) .......................... 100 14 900

(51) Int. Cl.[7] ................................. F16J 1/00
(52) U.S. Cl. ..................... 92/172; 123/193.6
(58) Field of Search ................ 92/172; 277/437, 277/457; 123/193.6

(56) References Cited

U.S. PATENT DOCUMENTS

| 4,359,229 A | | 11/1982 | Cattaneo |
| 4,387,627 A | | 6/1983 | Avezou |
| 5,149,937 A | | 9/1992 | Sutton et al. |
| 5,303,683 A | * | 4/1994 | Wittwer et al. .......... 123/193.6 |
| 5,515,770 A | | 5/1996 | Moon et al. |

FOREIGN PATENT DOCUMENTS

| CH | 373594 | 11/1963 |
| DE | 4205503 | 8/1993 |
| DE | 197 55 202 | 6/1999 |
| DE | 19840926 | 5/2000 |
| DE | 199 00 910 | 7/2000 |
| JP | 0701314 | 3/1995 |

* cited by examiner

Primary Examiner—Edward K. Look
Assistant Examiner—Michael Leslie
(74) Attorney, Agent, or Firm—Collard & Roe, P.C.

(57) ABSTRACT

To provide the pistons of internal combustion engines with profiled ring grooves in a simple manner. To this end, the profile is produced by laser beams.

2 Claims, 1 Drawing Sheet

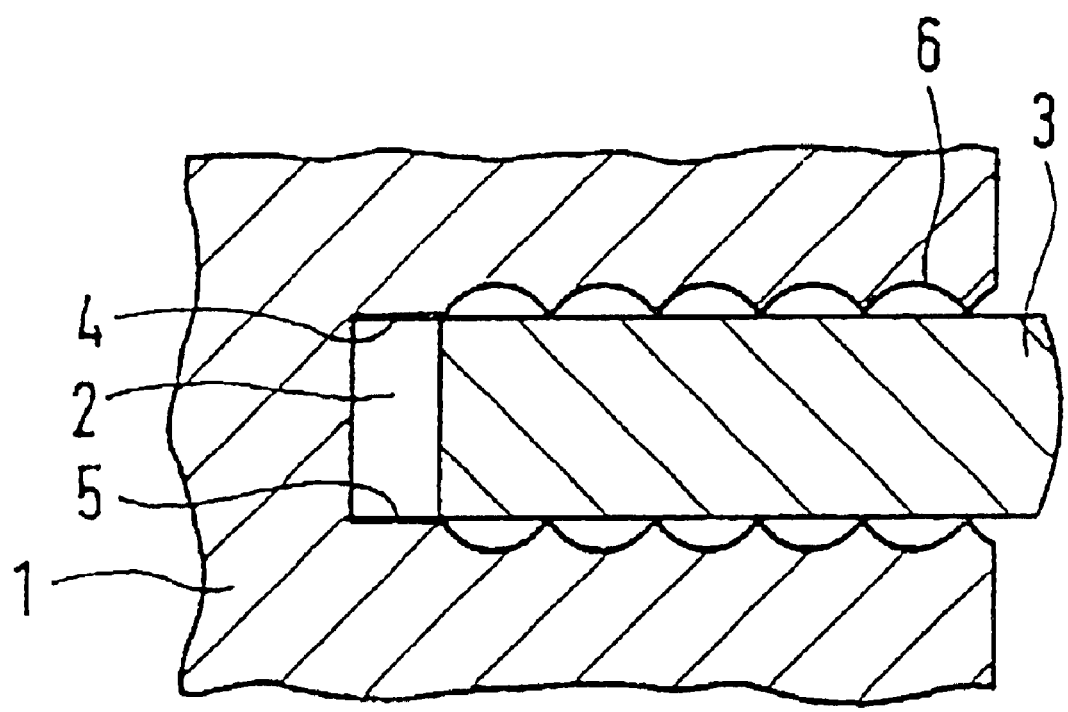

PISTON FOR INTERNAL COMBUSTION ENGINES

CROSS REFERENCE TO RELATED APPLICATIONS

Applicants claim priority under 35 U.S.C. §119 of GERMAN Application No. 100 14 900.6 filed on 24 Mar. 2000. Applicants also claim priority under 35 U.S.C. §365 of PCT/DE01/00483 filed on 7 Feb. 2001. the international application under PCT article 21(2) was not published in English.

The invention relates to a piston for internal combustion engines according to the preamble of claim 1. Such a piston is known from DE 4205503. In this connection, groove damage is supposed to be prevented by means of a profiling at least on the lower flanks of a ring groove.

The profiling is produced mechanically, by means of lathing. In this connection, an "audio record profile" is formed on the groove flank, for example. However, this profiling is difficult to produce in terms of production technology.

The invention therefore deals with the problem of producing such profiling in simple manner. This problem is solved, for pistons of the type of the preamble, by means of the characterizing feature of claim 1. Advantageous further developments are the object of the dependent claims.

Such profiling can be produced in simple manner and with good reproducibility, by using laser beams.

The invention will be explained in greater detail below, on the basis of a drawing. This shows:

FIG. 1 a ring groove of a piston for internal combustion engines with profiled groove flanks.

In an aluminum piston 1 of an internal combustion engine there is a ring groove 2 with a compression ring 3. Concentric grooves 6 that run around the circumference are made in the upper flank 4 of the groove and the lower flank 5 of the groove. These grooves are produced by means of laser beams.

What is claimed is:

1. A method of producing a piston for an internal combustion engine with at least one ring groove comprising the steps of:
   (a) forming a piston having at least one ring groove with a lower groove flank; and
   (b) producing profiling comprising concentric grooves in said lower groove flank by means of laser beams.

2. A method of producing a piston for an internal combustion engine with at least one ring groove comprising the steps of:
   (a) forming a piston having at least one ring groove with a lower groove flank; and
   (b) producing spiral profiling in said lower groove flank by means of laser beams.

* * * * *